United States Patent
Seung et al.

(10) Patent No.: US 8,885,926 B2
(45) Date of Patent: Nov. 11, 2014

(54) IMAGE AND DATA SEGMENTATION

(75) Inventors: H. Sebastian Seung, Cambridge, MA (US); Srinivas C. Turaga, Cambridge, MA (US); Viren Jain, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 848 days.

(21) Appl. No.: 12/760,668

(22) Filed: Apr. 15, 2010

(65) Prior Publication Data

US 2010/0266175 A1    Oct. 21, 2010

Related U.S. Application Data

(60) Provisional application No. 61/169,550, filed on Apr. 15, 2009, provisional application No. 61/169,602, filed on Apr. 15, 2009.

(51) Int. Cl.
  *G06K 9/62* (2006.01)
  *G06T 7/00* (2006.01)

(52) U.S. Cl.
  CPC ..... *G06T 7/0081* (2013.01); *G06T 2207/20081* (2013.01); *G06T 7/0093* (2013.01); *G06T 7/0083* (2013.01); *G06T 2207/20141* (2013.01)
  USPC ............................. 382/156; 382/128; 382/180

(58) Field of Classification Search
  USPC ......................................... 382/128, 156, 180
  See application file for complete search history.

(56) References Cited

U.S. PATENT DOCUMENTS

| | | | |
|---|---|---|---|
| 5,757,954 A * | 5/1998 | Kuan et al. | 382/133 |
| 7,020,329 B2 * | 3/2006 | Prempraneerach et al. | 382/164 |
| 7,343,032 B2 * | 3/2008 | Oakley et al. | 382/128 |
| 2006/0285747 A1 * | 12/2006 | Blake et al. | 382/180 |
| 2007/0109299 A1 * | 5/2007 | Peterson | 345/423 |
| 2009/0030864 A1 * | 1/2009 | Pednault et al. | 706/45 |

OTHER PUBLICATIONS

Cour et al. "Learning spectral graph segmentation." International Conference on Artificial Intelligence and Statistics. 2005, (Published before this application Apr. 2009).

Dollar et al. "Supervised learning of edges and object boundaries." Computer Vision and Pattern Recognition, 2006 IEEE Computer Society Conference on. vol. 2. IEEE, 2006, (Published before this application Apr. 2009).

Martin et al., "A Database of Human Segmented Natural Images and its Application to Evaluating Algorithms and Measuring Ecological Statistics," Proc. 8th Int'l Conf. Computer Vision, pp. 1-8 (2001), (Published before this application Apr. 2009).

(Continued)

*Primary Examiner* — Chan Park
*Assistant Examiner* — Eueng-Nan Yeh
(74) *Attorney, Agent, or Firm* — Occhiuti & Rohlicek LLP (57) ABSTRACT

Approaches to segmentation or detection of objects and their boundaries in images (or other data sets) do not rely on machine learning approaches that aim to minimize pixel-level agreement between a computer and a human. Optimizing such pixel-level agreement does not, in general, provide the best possible result if boundary detection is a means to the ultimate goal of image segmentation, rather than an end in itself. In some examples, end-to-end learning of image segmentation specifically targets boundary errors with topological consequences, but otherwise does not require the computer to "slavishly" imitate human placement of boundaries. In some examples, this is accomplished by modifying a standard learning procedure such that human boundary tracings are allowed to change during learning, except at locations critical to preserving topology.

30 Claims, 6 Drawing Sheets

(56) References Cited

OTHER PUBLICATIONS

Martin, David R., "Learning to Detect Natural Image Boundaries Using Local Brightness, Color, and Texture Cues," IEEE Transactions on Pattern Analysis and Machine Intelligence, vol. 26, No. 5, pp. 530-546, 2006, (Published before this application Apr. 2009).

Bertrand, Gilles, and Grégoire Malandain, "A New Characterization of Three Dimensional Simple Points," Pattern Recognition Letters 15: 169-175 (1994), (Published before this application Apr. 2009).
Bach, Francis R and Michael I. Jordan, "Learning Spectral Clustering, with Application to Speech Separation," Journal of Machine Learning Research, 7:1963-2001 (2006), (Published before this application Apr. 2009).

\* cited by examiner

IMAGE AND DATA SEGMENTATION

CROSS-REFERENCE TO RELATED APPLICATIONS

This application claims the benefit of U.S. Provisional Application No. 61/169,550, filed Apr. 15, 2009, and U.S. Provisional Application No. 61/169,602, filed Apr. 15, 2009, which are incorporated herein by reference.

BACKGROUND

This description relates to image and data segmentation.

The problem of segmentation or identification of objects or groups in data sets has applications in a wide number of fields. In the field of automated image processing and computer vision, problems including detecting boundaries between objects and detecting the presence of objects can be a difficult problem. For example, the problem of boundary detection has a long history in computer vision. In some approaches in a first era, boundaries were detected using gradient filters. In some approaches in a second era, contextual information was incorporated through optimization of objective functions based on Markov random fields, graph partitioning, and other formalisms. Today a new trend is to use machine learning to improve accuracy by training a computer to emulate human boundary judgments. In a typical approach, a boundary detector is trained by minimizing its pixel-level disagreement with humans.

One area of image processing in which boundary or object detection is important is in analysis of images of biological tissue. For instance, recent advances in electron microscopy (EM) have enabled the automated collection of nanoscale images of brain tissue. The resulting image datasets have renewed interest in automated computer algorithms for analyzing EM images. From the neuroscience perspective, development of such algorithms is important for the goal of finding connectomes, complete connectivity maps of a brain or piece of brain. To find connectomes, two image analysis problems must be solved. First, each synapse must be identified in the images. Second, the "wires" of the brain, its axons and dendrites, must be traced through the images. If both problems are solved, then it would be possible to trace the wires running from every synapse to the cell bodies of its parent neurons, thereby identifying all pairs of neurons connected by synapses. Other instances in which boundary or object detection in biological tissue is important is in analysis of medical images formed using computed tomography (CT) and magnetic resonance imaging (MRI) techniques, for example, locating and determining the extent of a tumor in the imaged tissue.

One approach to these problems in image processing makes use of boundary detection based on local image characteristics. For instance, pixels in an image are automatically labeled as boundaries versus object, and based on the labeled pixels, the image is segmented into objects. The automated labeling of boundary pixels can be based on a parametric technique, and the parameters are determined in a training procedure in which a set of training images and their corresponding boundary labeling are used to determine the parameters to be used in processing unknown images. For example, training images are analyzed manually to identify boundary pixels in the images, and the parameters are optimized to minimize the error between predicted and hand labeled boundary pixels (e.g., using a Hamming distance metric). A measure of accuracy of such approaches can use a metric based on the resulting segmentation of the image. For example, the Rand Index provides the average number of pairs of pixels in an image that are correctly identified as belonging to the same versus different segments or objects in the image.

SUMMARY

In a general aspect, certain approaches to segmentation or detection of objects and their boundaries in images (or other data sets) do not rely on machine learning approaches that aim to minimize pixel-level agreement between a computer and a human. Optimizing such pixel-level agreement does not, in general, provide the best possible result if boundary detection is a means to the ultimate goal of image segmentation, rather than an end in itself. In some examples, end-to-end learning of image segmentation specifically targets boundary errors with topological consequences, but otherwise does not require the computer to "slavishly" imitate human placement of boundaries. In some examples, this is accomplished by modifying a standard learning procedure such that human boundary tracings are allowed to change during learning, except at locations critical to preserving topology.

In another aspect, in general, the approach used for image segmentation is applied to a number of scenarios in which one desires high-throughput and automated analysis of structures within images. For example, such applications may include segmenting and profiling morphological properties of cells, segmenting neurons in light or electron microscopic images, and segmenting structures within MRI or other medical imaging.

In another aspect, in general, a system is applied to analysis of biological tissue. The system includes a segmentation apparatus configured to accept image data representing a three-dimensional image acquired from a biological sample, wherein the segmentation apparatus includes an input for accepting a data representation of segmentation parameters for controlling operation of the segmentation apparatus according to a segmentation procedure. The system also includes a parameter selection system configured to accept training image data and corresponding training segmentation data for a plurality of training images and produce the data representation of the segmentation parameters. The training segmentation data for a training image characterizes at least one of spatial extent of a plurality of objects in the training image and connectivity through a single object of pairs of locations in the training image. The parameter selection system is configured to select the segmentation parameters according to a parameter selection procedure that includes selecting the parameters according to a criterion based on at least one of (a) path connectivity between pairs of locations including path connectivity between non-adjacent locations and (b) a topology of the objects in the image.

Aspects may include one or more of the following.

The segmentation procedure includes determining a connectivity between pairs of locations according to the data representing the image and the segmentation parameters, and forming segments according to the determined connectivities.

The parameter selection procedure includes determining parameters associated with connectivity between pairs of location, and wherein the parameter selection procedure applies a non-uniform reliance on locations in the training images according to contribution of estimated connectivity at those locations to the estimated segmentation of the images.

The segmentation procedure determines a weighted connectivity between pairs of adjacent pixels of the training data, and forming the segments includes applying a threshold to the weighted connectivities to form binary connectivities and identifying pixels that are connected via sequences on adjacent pixels. For instance, the non-uniform reliance on pixel locations comprises a non-uniform reliance on pairs of adjacent pixels.

The parameter selection procedure includes, for each of a plurality of pixel locations in the training images, identifying a pair of adjacent pixels on a path between the pair of pixel locations, and determining the non-uniform reliance on pairs of adjacent pixels according to the identified pairs of adjacent pixels.

The parameter selection procedure includes iterating over a plurality of pairs of pixel locations in the training images, and for each pair of pixel locations, identifying a pair of adjacent pixels on a path between the pair of pixel locations according to a contribution of estimated connectivity between the pair of adjacent pixels to an estimated segmentation of the images and updating a subset of the segmentation parameters that affect an estimated weighted connectivity between the adjacent pixels.

The parameter selection procedure includes iterating over a plurality of pairs of pixel locations, including pairs of non-adjacent pixel locations, in the training images and for each pair of pixel locations identifying a link between two pixel locations on a path between the pair of pixel locations, the identified link representing degree of linkage between the pair of pixel locations. In some examples, the degree of linkage comprises a maximum linkage, which may be defined as maximum over paths linking the pair of pixel locations of minimal linkage between adjacent pixel locations the path.

The segmentation procedure includes determining a labeling as background versus object at locations according to the data representing the image and the segmentation parameters, and forming segments according to the determined labelings.

The parameter selection procedure includes selecting the parameters according to a criterion based topology of the objects in the images.

The parameter selection procedure includes jointly determining segmentation parameters and transformations of the training segmentation data associated with warpings of the segmentation data that maintain topology of the objects in the training images.

The parameter selection procedure comprises alternating between a phase for updating segmentation parameters and a phase for transformation of the training segmentation data.

Updating the segmentation parameters includes applying a gradient update according to a match between estimated pixel labelings and pixel labelings of the transformed segmentation data.

The parameter selection procedure comprises alternating between a phase for updating segmentation parameters and a phase for transformation of the training segmentation data.

The parameter selection procedure comprises jointly determining optimal segmentation parameters and transformation of the training segmentation data that maintains a set of topological properties of the training segmentations.

In another aspect, in general, a system is applied to forming segments of items represented in a data set. The system includes a segmentation apparatus configured to accept the data set representing a plurality of items, wherein the segmentation apparatus includes an input for accepting a data representation of segmentation parameters for controlling operation of the segmentation apparatus according to a segmentation procedure. The system also includes a parameter selection system configured to accept training data sets and corresponding training segmentation data for a plurality of training data sets and produce the data representation of the segmentation parameters. The training segmentation data for a training data set characterizes connectivity through a single segment of pairs of items in the training data set. The parameter selection system is configured to select the segmentation parameters according to a parameter selection procedure that includes selecting the parameters according to a criterion based on path connectivity through sequences of pairs of items.

Aspects can include one or more of the following features.

The parameter selection procedure includes, for each training data set, forming a data representation correspond to a spanning tree in which nodes of the tree are associated with items of the data set.

The parameter selection procedure includes, for pairs of items in the training data set, identifying a link on a path in the spanning tree between the pair of items, and updating parameters associated with that link according to the training segmentation data for the pair of items.

In another aspect, in general, software is stored on a computer readable medium. The software comprises instructions for causing a data processing system to implement a segmentation module configured to accept image data representing a three-dimensional image acquired from a biological sample, wherein the segmentation apparatus includes an input for accepting a data representation of segmentation parameters for controlling operation of the segmentation apparatus according to a segmentation procedure. The system also implements a parameter selection module configured to accept training image data and corresponding training segmentation data for a plurality of training images and produce the data representation of the segmentation parameters, the training segmentation data for a training image characterizing at least one of spatial extent of a plurality of objects in the training image and connectivity through a single object of pairs of locations in the training image. The parameter selection system is configured to select the segmentation parameters according to a parameter selection procedure that includes selecting the parameters according to a criterion based on at least one of connectivity between pairs of locations and a topology of the objects in the image.

Advantages of certain aspects can include or more of the following.

The approach may be applied to the challenging application of tracing the branches of neurons in three-dimensional images of brain tissue taken by electron microscopy. The empirical results show a dramatic reduction in the number of split and merge errors.

Other features and advantages of the invention are apparent from the following description, and from the claims.

DESCRIPTION

1 Introduction

Figure 1:
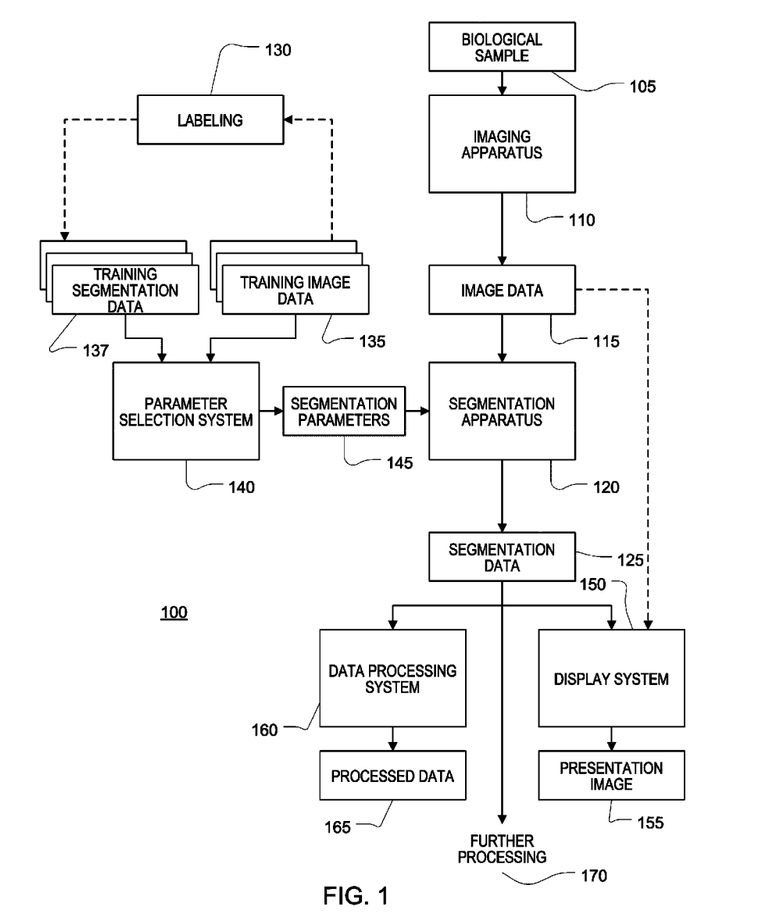
FIG. 1 is a block diagram of an image processing system.

Referring to FIG. 1, a system 100 processes a biological sample 105, and provides as output, for instance, a presentation image 155 or processed data 165, or provides input to further processing 170. The system 100 is described here in the context of an exemplary application related to analysis of biological tissue, but it should be understood that the techniques described below are applicable to a wider variety of image analysis, and more generally to a variety of data analysis tasks, as is outlined later in this description.

In the system shown in FIG. 1, the biological sample 105 is processed in an imaging apparatus 110 to produce image data 115. In some examples, the imaging apparatus comprises an electron microscope which processes a sample of brain tissue to produce three dimensional image data, for example, providing an intensity level at each voxel (i.e., three-dimensional pixel) location in a rectilinear (e.g., cubic) arrangement of pixel locations. In an example, one goal is to identify neurons in the image data.

A segmentation apparatus 120 processes the image data 115 and produces segmentation data 125. In some examples, the segmentation apparatus is implemented using a computer processor controlled by software instructions as well as segmentation parameters 145 stored on a computer readable media. In some examples, the segmentation data comprises a labeling of pixels according to distinct labels for each separate object, for example, using consecutive positive integers (1, 2, ... ), or as background, for example, using an index zero. Such a labeling is referred to as a segmentation, S, where the label of a pixel j has value $s_j$. The segmentation apparatus is parametric (or otherwise configurable or trainable) and is configured according to segmentation parameters 145, which are determined, for instance, during a prior training phase which is described below. The segmentation parameters are stored on computer readable media in a form that controls and/or imparts functionality to the segmentation apparatus.

In some examples, the segmentation data 125 may be used as an input to a display system 150, for example, to produce a presentation image 155 that provides am operator (e.g., technician, researcher, physician or other clinician) with a view of the objects detected by the segmentation apparatus. The detected objects may be indicated in the presentation image in various ways, for example, using color, opacity, etc. In some examples, the clinician may be able to provide inputs that affect the segmentation, for example, providing an input (e.g., a threshold) that trades off detection of isolated objects versus merging of objects together.

Generally, the training process that determines the segmentation parameters 145 makes use training image data 135, which in general comprises the outputs of the imaging apparatus 110 for a corresponding set of biological samples (not shown). The training image data is labeled, for example in a manual labeling procedure 130, to produce training segmentation data 137. Generally, the training segmentation data identifies locations of objects in the training image data, for example, providing segmentation values for some or all of the pixels in the corresponding image data. A parameter selection system 140 processes the training image data 135 and corresponding training segmentation data 137 to produce the segmentation parameters 145 that are used by the segmentation apparatus 120 for the unknown image 105. In some examples, the parameter selection system 140 is implemented using a computer processor. The parameter selection system 140 is matched to the segmentation apparatus 120 such that the segmentation parameters 145 that are passed between these modules link their functionality.

Very generally, a number of approaches are described below in which the parameter selection system 140 selects the segmentation parameters 145 to match the overall structure of the objects in the training images, without necessarily attempting to reproduce a pixel-by-pixel match between automatically determined segmentations for the training image data 135 and the training segmentations 137 determined in the labeling process 130.

Figure 2A:
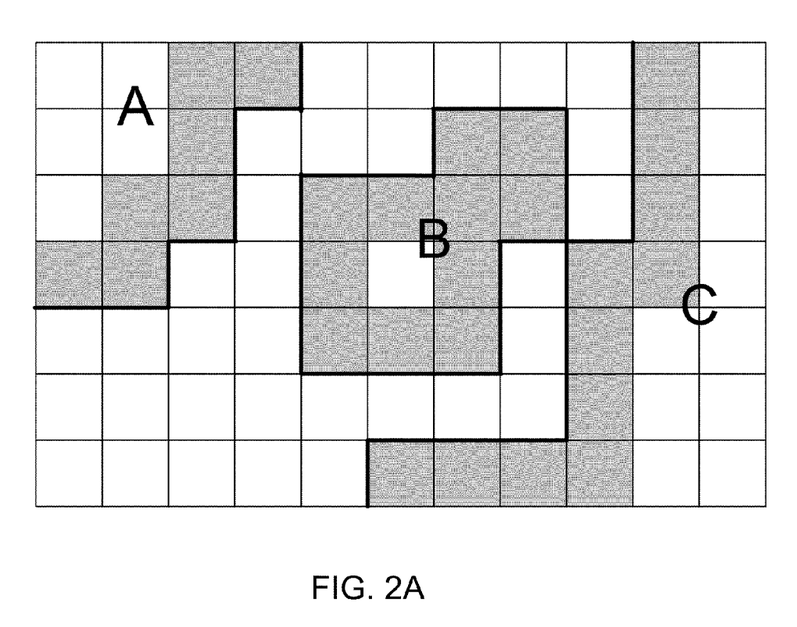
FIG. 2A is a representation of a two-dimensional pixel map showing edge pixels of objects.

Before discussing the various approaches for implementing the segmentation apparatus and associated parameter selection system, a number of representations and characterizing metrics of image data are outlined. Various approached described below use one or both of the representations shown in FIGS. 2A-B. First, referring to FIG. 2A, a two-dimensional image is represented as having object regions A, B, and C, with the remainder of the image forming a background. Three-dimensional data can be similarly represented, however, for the sake of presentation, the examples below focus primarily on two-dimensional situations. A grid of square pixels is illustrated, with the pixel based boundary of the object regions being shown with a bold line. The image data itself is not illustrated. In general, each pixel is associated with a numerical scalar or vector of image features, for example, representing image intensity in one or more spectral bands. The pixels in the object regions at the boundary of the object regions are shown in gray, and are referred to as "boundary pixels."

Figure 2B:
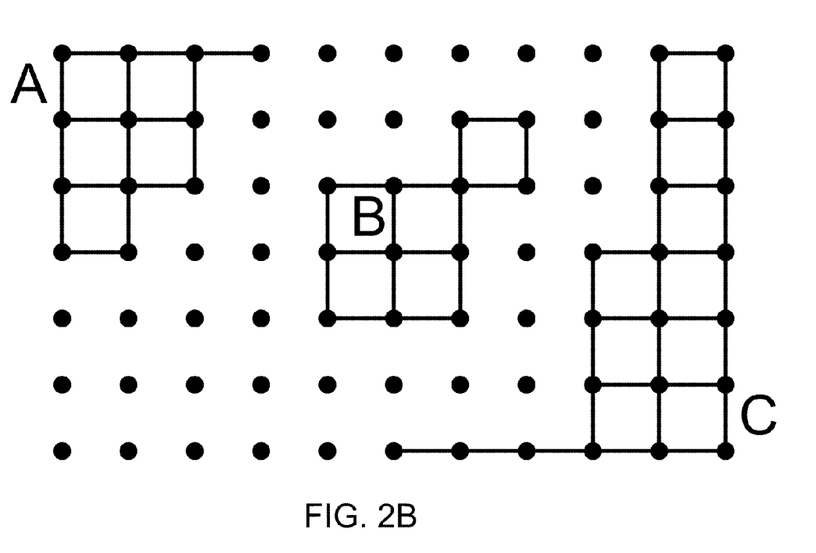
FIG. 2B is a representation of a corresponding affinity graph.

Referring to FIG. 2B, another representation of the image uses an affinity graph in which each node corresponds to one of the pixels. Edges join certain pairs of nodes such that each connected set of nodes corresponds to one of the object regions. In general, the edges in the representation form a disjoint connected subgraphs of a complete graph. For instance, the complete graph may include all edges between nearest neighbor nodes, for example, with four edges per node in two dimensions and six edges per node in three dimensions, or alternatively, eight edges per node in two dimensions and 26 edges per node in three dimensions. Note that the same connected sets of nodes may be achieved with different subgraphs, for instance, by removing edges that do not divide a connected set of nodes, therefore the binary affinity graph is not necessarily unique for any particular segmentation.

Figure 3A:
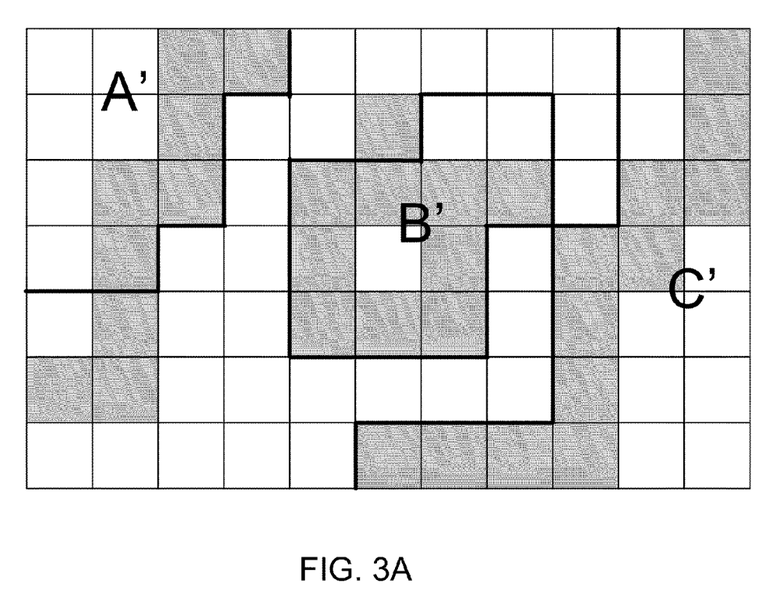
FIGS. 3A and 3B are representations of transformations of the representations shown in FIGS. 2A and 2B, respectively.
Figure 3B:
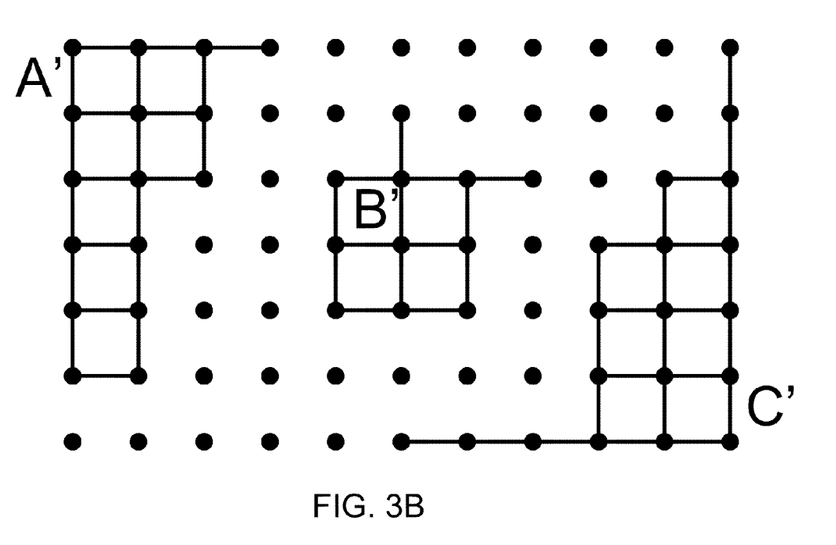

Referring to FIGS. 3A-B, minor changes in identification of boundary pixels or corresponding edges in a graph representation do not necessarily change the overall structure of the objects in a segmented image. In particular, certain changes may move the boundaries of objects somewhat, but do not change the overall structure of the segmentation. For example, referring to FIG. 3A, an identification of the gray pixels as boundary pixels defines regions A', B', and C', which do not exactly match regions A, B, and C, in FIG. 2A, yet the result generally preserves the overall structure.

To more precisely define the changes that are sufficiently minor to not affect the structure, a definition of "simple pixels" (also referred to below as "simple points") is used. A binary image L is formed such that all the pixels in non-background regions (e.g., in regions A, B, and C, in FIG. 2A) are given a value 1, and all remaining pixels are given a value 0 to form the binary image L. A simple pixel is then defined as a location in the binary image L at which a pixel can be flipped to its complementary value without changing any topological properties of the image. More specifically, the simple pixels are points in a binary image that can be modified (i.e., flipped from foreground to background or vice versa) without altering topological properties of the image including the numbers of components, cavities, and in the case of 3D images, tunnels. We write simple (L) to denote the set of simple points of L.

This definition of simple pixels is used to define a "warping" of a digital image. Specifically, given an initial binary image L*, then another binary image L is a warping of L* if a sequence of flips of simple points can yield L. In some examples, the allowable pixel flips are restricted to occur only in certain regions of the image, for example, within a prescribed distance of an edge in the original image L*. Note that given an original segmentation S*, a warping S can be defined to correspond to the warping of the related binary image. The notation L ◁ L* is used to denote that L is an allowable warping of L*.

Some approaches described below make use of segmentations based on affinity graphs. An affinity graph can be binary, for example, as shown in FIGS. 2B and 3B, with the connected sets of nodes corresponding to objects. An affinity graph can also be weighted such that a edge joining a node i and a node j has a weight $A_{ij}$. A binary affinity graph can be formed from a weighted affinity graph by retaining edges whose weights exceed a threshold value.

It can be useful to introduce the concept of maximin affinity, which is defined for any pair of pixels in an affinity graph. Let $\mathcal{P}_{ij}$ be the set of all paths in the graph that connect pixels i and j. For every path P in $\mathcal{P}_{ij}$ there is an edge (or edges) with minimal affinity. This minimal affinity on a path P is written as $$\min_{\langle k,l \rangle \in P} A_{kl}$$

where $\langle k,l \rangle \in P$ means that the edge between pixels k and/are in the path P. A maximin path $P_{ij}^*$ is a path between pixels i and j that maximizes the minimal affinity, $$P_{ij}^* = \operatorname{argmax}_{P \in \mathcal{P}_{ij}} \min_{\langle k,l \rangle \in P} A_{kl}.$$

The maximin affinity of pixels i and j is the affinity of the maximin edge, or the minimal affinity of the maximin path, $P_{ij}^*$ $$A_{ij}^* = \max_{P \in \mathcal{P}_{ij}} \min_{\langle k,l \rangle \in P} A_{kl}.$$

Based on these definitions, a pair of pixels is connected in the thresholded binary affinity graph if and only if their maximin affinity exceeds the threshold value.

Pixel pairs can be classified as connected or disconnected by thresholding maximin affinities. Let $\hat{S}$ be the segmentation produced by thresholding the affinity graph $A_{ij}$ and then finding connected components. Then the connectivity indicator function between pixel locations i and j is $$H(A_{ij}^* - \theta)$$

where H is the Heaviside step function and θ is the threshold applied to the affinities.

As introduced above, one measure of a similarity between two segmentations, S and T, is the Rand Index. The Rand Index is a statistical measure of the similarity between two data clusterings, which can be used as a measurement of segmentation quality that can operate directly on a segmentation by interpreting a segmentation as a grouping of pixels into separate clusters. More formally, consider an image space X with N pixels $\{x_1, \ldots, x_N\}$ and two segmentations S and T which assign to each pixel location i an integer label $\{s_i\}$ and $\{t_i\}$ respectively. Then the Rand Index is a [0,1]-valued measure of the number of pairs of points having the same label relationship in S and T:

$$R(S, T) = \binom{N}{2}^{-1} \sum_{i,j \neq i} \delta(s_i = s_j, t_i = t_j) + \delta(s_i \neq s_j, t_i \neq t_j)$$

Therefore, the Rand Index is 1 when the two segmentations perfectly match, and 0 when they completely disagree.

The Rand Index effectively focuses on whether the overall grouping of points into separate segments is correct; subtle geometric differences between two segmentations will decrease the Rand Index but will be much less numerically significant than, for example, the erroneous merging of two regions. Conceptually the Rand Index focuses on whether a segmentation has achieved the correct connectivity between pixels (i.e., whether two pixels are connected or disconnected correctly).

2 First Embodiment

Figure 4:
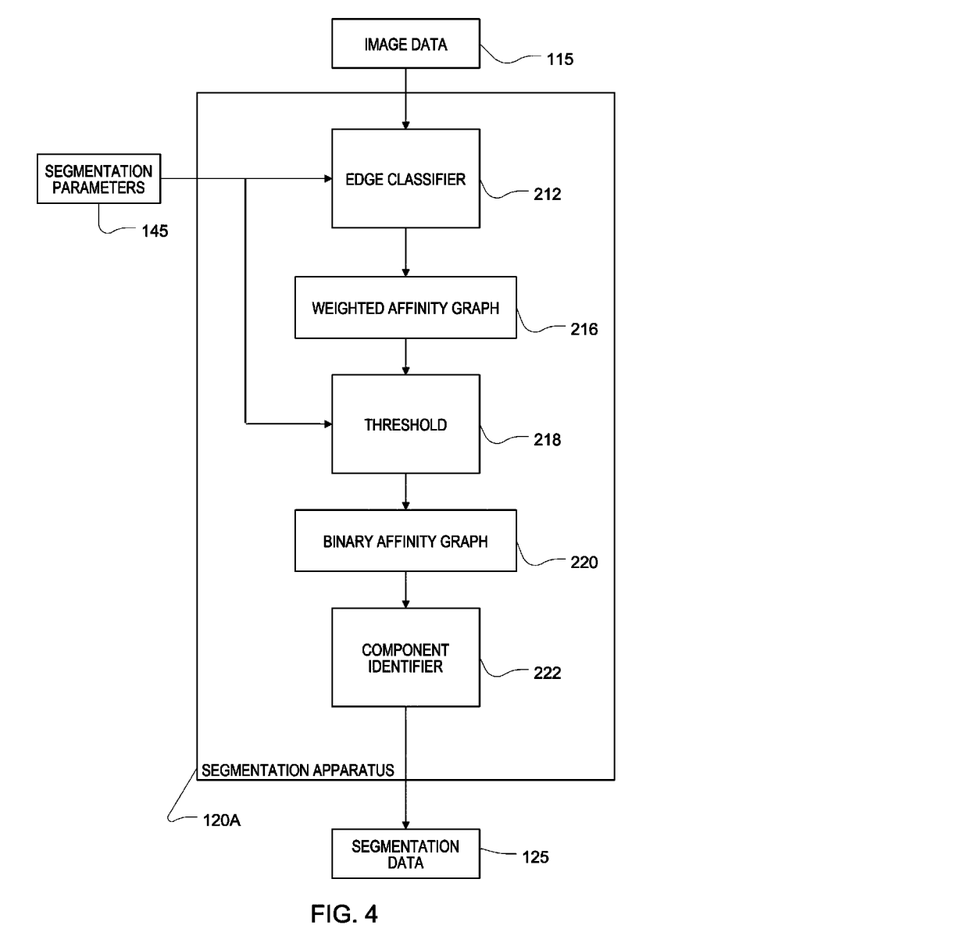
FIG. 4 is a block diagram of a first example of a segmentation apparatus.

A first embodiment of a segmentation apparatus 120 shown in FIG. 1 is the segmentation apparatus 120A shown in FIG. 4. This embodiment uses at its basis a classification approach for edges in an affinity graph. The image data 115 is passed to an edge classifier 212. The classifier 212 outputs a weighted affinity graph, which provides a numerical degree to which each edge joining neighboring pixels in the image belongs to a same object versus forms a boundary between objects. The classifier 212 makes use of segmentation parameters 145, which are trained using a procedure described below. The weighted affinity graph 216 is passed through a threshold function 218, which transforms these numerical degrees into a binary affinity graph 220 (i.e., connectivity), and the component identifier 222 forms the connected components from the binary affinity to produce the segmentation data 125 at the output of the segmentation apparatus.

Figure 5A:
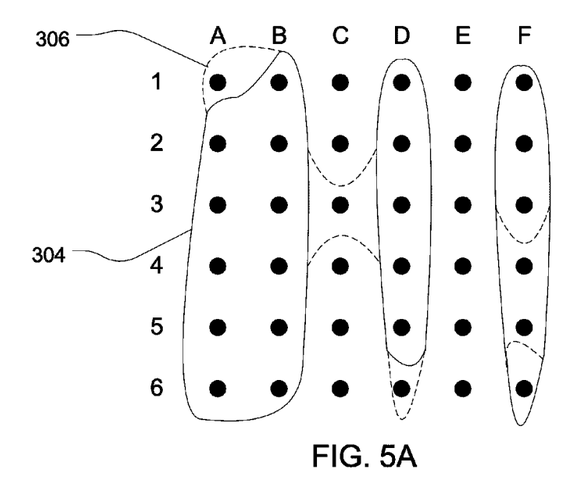
FIG. 5A is a representation of a pixel segmentation.

A simplified two-dimensional example is illustrated in FIG. 5A. In this figure, which represents a 6×6 pixel image (with pixels labeled A1 through F6 for discussion), a solid line 304 shows a human segmentation of the image into three connected components. A computer segmentation is illustrated by a dashed line 306. As illustrated, the computer segmentation erroneously merges two of the true components (via pixel C3), and erroneously splits a true component (via pixel F4). Furthermore, the detailed boundaries of components do not match at pixels A1, A6, and D6.

Figure 5B:
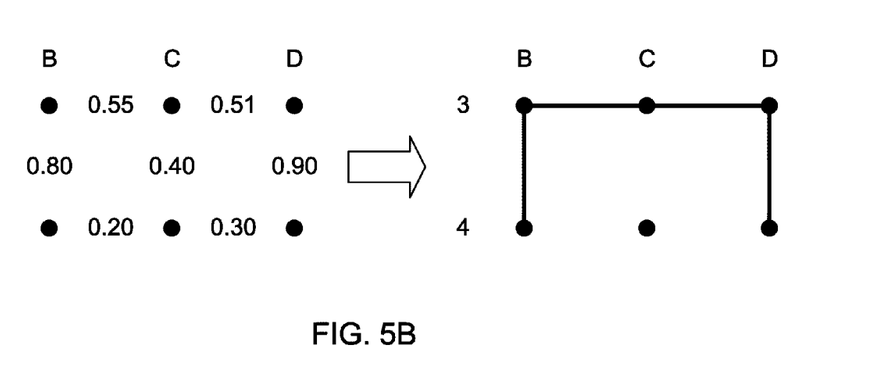
FIG. 5B is a representation of weighted affinity between pixels and a corresponding binary affinity graph.

In this embodiment, very generally, training of the segmentation parameters 145 involves updating of the parameters for the edge classifier 212 to focus on edges in the weighted affinity graph that significantly affect the segmentation result. The computer segmentation is determined according to the edge affinity data associated with each of the links joining adjacent pixels. A portion of the affinity data is illustrated in FIG. 5B for a limited number of pixels, with quantities less than 0.5 being associated with boundaries and quantities greater than 0.5 being associated with a link joining two pixels within one component of the segmentation. Based on the thresholding at a value of 0.5, a portion of a resulting binary affinity graph is shown in FIG. 5B. Note that the binary affinity graph incorrectly links nodes B3-C3 and C3-D3, and erroneously breaks C3-C4, and is otherwise correct.

In order to focus training on links that affect the segmentation, pairs of pixels are considered in the training. For example, a pair of pixels, B3 and D4 are considered. According to the manual segmentation as shown in FIG. 5A, these pixels are truly in separated components. However, referring to FIG. 5B, weighted link affinity data for links in the vicinity of these pixels, and binary affinity data based on thresholding the values in FIG. 5B, shows that the computer segmentation links pixels B3 and D4 into a common component. The training to correct this error is focused on a particular edge by considering the paths joining the two pixels (e.g., B3-C3-C4-D4, or B3-C3-D3-D4). Connectivity along a path is assessed according to the minimum affinity value, and the path with the largest such minimum value is attributed the error. For example, the path B3-C3-D3-D4 has a minimum affinity value of 0.51 (at link C3-D3), which is the maximum over the paths linking pixels B3 and D4. Based on this identification of C3-D3 being the critical link joining B3 and D4, the weights for the classifier are adjusted so that the weighted affinity value for link C3-D3 is driven down from 0.51 toward 0.

In a similar manner, certain links may be associated with erroneous splitting of a segment. For example, paths from pixel F1 to F5 may identify the link F3-F4 as being the link that causes the erroneous separation of pixels F1 and F5 into different components.

Effectively, by considering a large number of pairs of pixels (e.g., all pairs of pixels, pairs of pixels within a fixed distance of one another, pairs of pixels chosen from a subset that are hand labeled), and for each pair of pixels identifying the portion of the image (i.e., the edge) that most contributes to the training data segmentation (merging or segmentation error), the links that contribute to erroneous merging or splitting of components are more highly weighted in the retraining of the classifier weights, thereby focusing the training on the end-to-end accuracy of the overall segmentation that is determined by the weighted affinity data.

A description of an implementation of the first embodiment is provide below. For reference, notation used in this description is provided for reference.

2.1 Notation

I The underlying image, or more generally a dataset $I_n$ Individual pixel, or other data element, at coordinate $n \in \mathcal{N}$ $\mathcal{G} = \mathcal{N}$ Graph, where the image/data is defined at nodes of the graph $\mathcal{G}$ $\mathcal{N}$ The nodes of the graph. In the case of a three (two) dimensional image, the nodes form a regular rectangular lattice.

$\mathcal{L}$ Edges of the graph. In the case of the three (two) dimensional image, the links join adjacent node in the lattice.

$\mathcal{P}_{i,j}$ The set of paths from node i to node j in the graph $\mathcal{G}$.

* In general, the superscript * represents the "truth," for example as set by human annotation of images, and no superscript indicates computer generated.

$s_n^*$ The true classification of the image/data at coordinate n.

$S^*$ The true classification of the entire image.

$s_n$ The computer classification of the image at coordinate n.

$S$ The computer classification of the entire image.

$\delta(s_i, s_j)$ Similarity between class $s_i$ and class $s_j$: 0 if $s_i \neq s_j$; 1 if $s_i = s_j$.

$e_l$ The computer generated classification of edge l in the graph.

$mm_{i,j}$ Maximin distance between nodes i and j, computed as $$mm_{i,j} = \max_{p \in \mathcal{P}_{i,j}} \min_{l \in p} e_l$$

$\Theta(mm_{i,j})$ Thresholding of $mm_{i,j}$: 0 (disconnected) if less than the threshold and 1 (connected) if greater;

$m_l$ Dissimilarity for edge l in the graph.

$m_{i,j}$ Minimax ultrametic between nodes i and j $\in \mathcal{N}$ computed as $$m_{i,j} = \min_{p \in \mathcal{P}_{i,j}} \max_{l \in p} m_l$$

$l_{i,j}^{(max)}$ The minimax edge on paths from i to j.

$$l_{i,j}^{(max)} = \operatorname{argmax}_{l \in p_{i,j}^{(min)}} m_l; \quad p_{i,j}^{(min)} = \operatorname{argmin}_{p \in \mathcal{P}_{i,j}} \max_{l \in p} m_l; \quad m_{ij} = m_{l_{i,j}^{(max)}};$$

$m_l^*$, $m_{i,j}^*$ Define $m_{i,j}^* = 00$ if nodes i and j are in a connected component, and 1 otherwise, and define $m_l^* = m_{i,j}^*$ for l=(i, j).

$\Phi(m_{i,j})$ Thresholding of $m_{i,j}$: 0 (connected) if less than the threshold and 1 (disconnected) if greater.

$M(l; I, W)$ The computer generated ultrametric for link l given an image (or data set) I and estimated parameters W.

$T(\mathcal{N}, \mathcal{L}^{(tree)})$ Clustered subgraph of $\mathcal{G}$, such as a spanning tree, such that $\mathcal{L}^{(tree)} \subseteq \mathcal{L}$, for example, formed by agglomerative clustering of the nodes according to an ultrametric between nodes.

2.2 Initial Estimation of W

Initial training uses a set of images I and corresponding true pixel classification S*. An error function $$E = \frac{1}{2} \sum_{l \in \mathcal{L}} (m_l^* - M(l; I, W))^2$$

is minimized by varying W, for example, using gradient-based incremental training 2.3 Training on Split and Merge Points Consider a choice of pairs of pixels (node of graph) i and j. The minimax edge joining the nodes based on the computer calculation is $l_{i,j}^{(max)}$, defined in the Notations section above, and therefore $m_{i,j} = m_{l_{i,j}^{(max)}}$. The training data specifies that the true metric should be $m_{i,j}^*$ (e.g., 0 if the two nodes are in a connected class, and 1 otherwise).

The contribution of the minimax link corresponding to a pair of nodes i and j to the error function is $$\frac{1}{2}(m_{i,j}^* - M(l_{i,j}^{(max)}; I, W))^2.$$

The derivative with respect to the weights W is $$-(m_{i,j}^* - M(l_{i,j}^{(max)}; I, W)) \frac{\partial}{\partial W} M(l_{i,j}^{(max)}; I, W)$$

The procedure for training on the splits and merges is to iterate over random pairs of nodes (i, j) and for each pair to update the weights W according to the derivative above.

In some implementations, the random pairs of points are restricted to be within a predetermined distance of one another.

2.4 Spanning Tree Implementation

In some implementations, given the link dissimilarities $m_l$ determined according to the parameters W, a minimal spanning tree is formed for the nodes of the graph. The) spanning tree forms a subgraph $T = (\mathcal{N}, \mathcal{L}^{(tree)})$ such that $\mathcal{L}^{(tree)} \subseteq \mathcal{L}$, and that for any pair of nodes i and j, the minimax link $l_{i,j}^{(max)}$ is on the path from i to j in the spanning tree.

In an iteration with a random node pair (i j), the minimax link is located in the spanning tree, and the parameters of W are updated as above.

After updating the parameters, a portion of the spanning tree is recomputed according to the updated parameters and the iteration continues.

3 Second Embodiment

Figure 6:
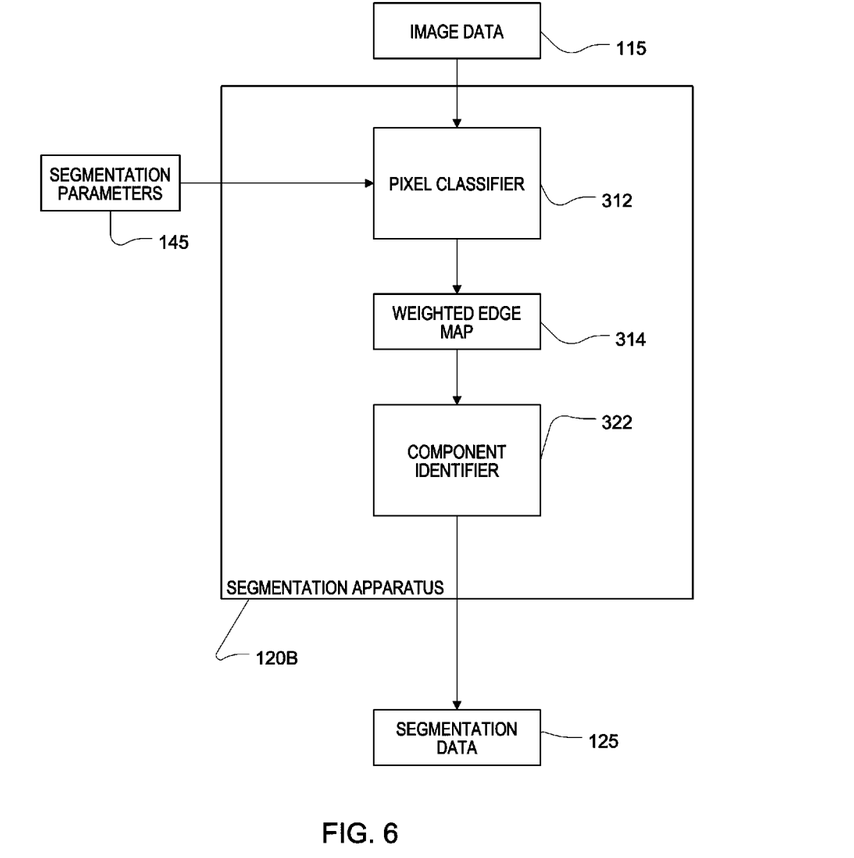
FIG. 6 is a block diagram of a second example of a segmentation apparatus

Referring to FIG. 6, in second embodiment the segmentation apparatus 120B makes use of a pixel classifier 312, which accepts the input image data 115 and produces a weighted map 314, which provides a value in the range [0,1] for each pixel location. Larger values indicate greater certainty of the pixel being in an object and a lower value indicating a greater certainty of the pixel being in the background. The weighted map 314 is processed in a component identifier 322, which outputs the segmentation data 125 as output of the segmentation apparatus 120B.

The goal of the training procedure for the segmentation parameters 145 that are used by the pixel classifier 312 is to find a function that maps an image patch to an estimate of the probability that the central pixel is labeled "1." We will call such a function an image patch classifier. If the classifier is applied to patches centered at all locations in an image, it produces an output image that is called in-out map. In some alternative examples, rather than an in-out map, the pixel classifier is formulated to produce a boundary map identifying pixels that are likely to be edge pixels. The analog values in this probability map can be thresholded to produce a binary image labeling. In this example, both the classifier output and ground truth are represented as in-out maps.

Consider a binary machine labeling T and a human labeling L* of the same image. When optimizing pixel error, we would ideally like to minimize the number of binary disagreements between T and L*: $\Sigma_i \delta(t_i, l_i^*)$ where the machine and human labeling at location i are denoted by $t_i$ and $l_i^*$, respectively.

One way of applying supervised learning to boundary detection is to find an image patch classifier, a function that maps an image patch to an estimate of the probability that the central pixel is a boundary. The output of the pixel classifier 312 is referred to as the boundary map 314 and written as $F_I(\vec{w})$, where I is the image, and $\vec{w}$ specifies the adjustable parameters in segmentation parameters 145. The analog values in the boundary map can be thresholded at scalar value θ to produce a binary boundary labeling $H(F_I(\vec{w})-\theta)$, where image-valued quantity H(M) represents the Heaviside step function applied to each pixel location in a map M.

3.1 Learning Pixel Error

Supervised learning can be formulated as the minimization of the pixel error $\|H(F_I(\vec{w})-\theta)-L^*\|^2$ with respect to the classifier parameters $\vec{w}$, where r is a human boundary labeling of the same image. However, it is often easier to optimize a smooth cost function that depends on the real-valued output of the classifier. One choice is the squared error: $d(F_I(\vec{w}), L) = \Sigma_i \|f_i(\vec{w}) - l_i\|$, where the boundary map and human boundary labeling at location i is written as $f_i(\vec{w})$ and, respectively. The dependence of $f_i(\vec{w})$ on the image I is left implicit for notational convenience. Optimizing the squared error thus serves as an approximation to optimizing the binary classification error. Since the squared error cost function depends smoothly on the analog output of the classifier, gradient descent can be applied to find a local minimum. A "batch" implementation computes the gradient of the cost function for the whole image or set of images. An "online" implementation computes the gradient of the cost function for a single pixel. Since the pixel is chosen at random, the average of the online gradient is equal to the batch gradient, which means that online learning is a form of stochastic gradient descent. Online learning is described in the following algorithm:

```
gradient ( I,L,w⃗,k )
  for iter = 1 to k
    i = random location in random image
    w⃗ := w⃗ - η∇_{w⃗} d(f_i(w⃗),l_i)
  end
  return w⃗
``` where η is a rate parameter, which is a positive and generally small number.

3.2 Warping Error

A preferred approach to supervised learning of the parameters does not necessarily attempt to exactly match the training segmentation data 137. Rather, for any choice of segmentation parameters, a best warping to the training segmentation is found to match the boundary map output from the pixel classifier. Specifically, we define the warping error as $$D(T \| L^*) = \min_{L \triangleleft L^*} \|T - L\|^2$$

One approach to finding the best warping in the above minimization is to use a descent algorithm for finding local minima During warping, we are allowed to flip simple points of L that lie inside the mask M, i.e., points in the set simple (L)∩M. Flipping any such pixel j of L satisfying $|t_j - l_j| 0.5$ produces a new warping with smaller error. A descent algorithm greedily picks the pixel for which this error reduction is the largest, breaking ties randomly as follows:

```
warp( L*,T,M )
  L := L*
  do
    S := simple(L)∩M
    i := argmax_{j∈S} |t_j-l_j| , breaking ties randomly
    if |t_i-l_i| > 0.5
      l_i := 1-l_i
    else
      return L
  end
```

Since $\|T-L\|^2$ is decreasing, the algorithm is guaranteed to converge to a local minimum of the warping error. How problematic is the lack of an efficient algorithm for finding a global minimum? This does not appear to be a problem in practice.

3.3 Learning Warping Error

In this preferred approach, warping error is used to optimize the classifier weights rather than pixel error, formulating the weight selection as an optimization of $D(F_I(\vec{w}) \| L^*)$ with respect to $\vec{w}$, $$\min_{\vec{w}} D(H(F_I(\vec{w}) - \theta) \| L^*,$$

which can be represented using the definition of $D(T||L^*)$ above as the nested optimization:

$$\min_{\vec{w}} \min_{L \triangleleft L^*} \|H(F_I(\vec{x}) - \theta) - L\|^2.$$

We call this method Boundary Learning by Optimization with Topological Constraints, or BLOTC. Note that standard training is the case where no warping of L* is allowed, i.e., the geometric constraint becomes completely tight. In order to make this cost function easier to optimize, we again use a smooth approximation of the binary error.

The preferred approach makes use of an algorithm that alternates between gradient descent for $\vec{w}$ and descent for the warped image L as follows:

```
blotc ( I,L*,M,k₁,k₂ )
  L := L*
  w⃗ := random initialization
  w⃗ := gradient (L, w⃗, k₁)
  repeat
     L := warp ( L,F_I(w⃗),M )
     w⃗ := gradient ( I,L,w⃗,k₂ )
  until convergence
  return w⃗
```

4 Classifiers

The approaches can be applied with a variety of parametric pixel or edge classifiers. One choice is a convolutional network. One examples of such a network that has been evaluated containing 6 hidden layers, 24 feature maps in each hidden layer, and full connectivity between feature maps in adjacent layers. Each individual filter has 5×5 pixels, but the multiple-layers yield an effective field of view of the classifier of 28×28 pixels. In an example with the BLOTC approach examples, such a network was trained for 1,000,000 updates using the traditional optimization with the labels fixed. The BLOTC network was initialized with the weights from a standard network after 500,000 gradient updates and then further trained for 500,000 additional updates using BLOTC optimization. Each network was trained in roughly 18 hours, using a layer-wise procedure that iteratively adds hidden layers to the network architecture. The training used a fast shared-memory GPU implementation that provides between a 50-100× increase in training speed as compared to CPU implementations.

5 Other Embodiments

In other embodiments, one or both of two general approaches, of which the description above provides specific examples, generally focus the training of the classifier on significant edges or pixels. Other approaches also permit certain discrepancies between the manual segmentation and the computer segmentation if the discrepancies are not significant in that they do not affect the segmentation.

For example, the specific example in which a nested optimization considers both warping of the training segmentation as well as parameter optimization of the classifier is an example of modification of the training data to better match the automated prediction to the extent that the modification is not significant. In the example above, maintaining the digital topology in permissible warpings is the example of an insignificant modification. In other examples, modifications of the training data can include other types of changes. For example, rather than warping by flipping pixels, other forms of warping may be used (e.g., continuous warping or deformations of the image space).

A specific example presented above focuses parameter updating on maximin edges in an affinity graph addresses edges that may affect the segmentation more than others. Other focusing on significant edge or pixel classification parameters may be used in other embodiments. For example, in a pixel classification rather than an edge classification approach, the importance of correct classification of certain pixels may vary by pixel, and therefore a weighting to the important pixels may be used. Furthermore, the approach to updating parameters of maximin edges may alternatively focus on all edges weighting their contribution according to the degree to which they are close to a maximin value.

Examples presented above use training image data 135 that is separate from the image data 115 of an unknown sample. In some examples, an operator can provide some partial labeling of the data for the unknown image, for example, by indicating a small number of pairs of pixels that are in same versus different object. Such labeling can occur prior to applying the segmentation procedure to the unknown data, or as a correction phase after an initial segmentation. When such partial labeling of the unknown data is available, the parameter selection system 140 can adapts the segmentation parameters 145 to better match the unknown sample.

6 Applications

As introduced above, examples of the approaches described above address segmentation of two- (e.g., image slices) and three-dimensional (e.g., volume) images of biological or other physical objects. In some examples, the segmentation 130 determined by the system is used to form data representing an output image, for example, for presentation to a user on an image output device (e.g., a graphical computer display). Examples of such output images include enhancements showing the segmentation of the image in conjunction with the original image. In some examples, segmented components are further classified (e.g., according to image properties within the segments) and the segments are enhanced with color, intensity, or other visual attributes. In some examples, automatic segmentation of an image is used for further computation, and the result of the computation is stored, further processed, or presented to a user. For example, the segmentation may be used for counting components (e.g., cells, neurons), or determining physical characteristics (e.g., average size, area, cross-section).

In another example, techniques described above are applied to a task of tumor detection and/or localization. As a specific example, tumors are detected and/or localized in two-dimension mammography images (e.g., X-ray images of projections through breast tissue) or in three dimensional images of breast tissue (e.g., using Computed Tomography (CT), Magnetic Resonance (MR), or ultrasound techniques). In some examples, the techniques are based on training a classifier to classify each image location (e.g., pixel) as tumor versus non-tumor, or for classifying adjacent locations as same versus different object (e.g., both tumor or both normal versus transition/edge between normal and tumor). In training, each abnormality has some geometry which will be subjected to warping, but the number of independent abnormalities in each image (which may be zero) is a topological feature that is preserved. The approach may be applied to a variety of abnormalities or objects in the image, which typically include (micro)califications, masses, and architectural distortions, not all of which are necessarily malignant.

7 Non-Image Data Sets

For a data set I of size N, a fully linked graph with N nodes is formed. An initial estimate of W that parameterizes the link metric is formed as above. Note that in the image segmentation approach above, the graph with nodes corresponding to pixels is not fully connected, but rather has links forming a rectangular lattice.

As above, a minimum spanning tree of the graph is formed using the computer predicted metrics $m_j=M(l;I,W)$. For example, the nodes are agglomeratively clustered to form the spanning tree.

For a fixed tree, a series of iterations are performed. At each iteration a pair of data points is selected, and W is incremented according to the derivative above.

After a number of iterations, the agglomerative clustering tree is recomputed, and a further set of iterations is performed.

To classify a new data point, the trained ultrametric is used to identify the nearest training data point to the new data point to classify the new data point according to one of the classes found in the training data.

As introduced above, the parameter estimation approach can include adaptation of the parameters based on partial labeling or correction of the unknown data set.

Applications to such non-image data can include forming groups or clusters of items according to trainable similarity metrics between pairs of items (e.g., for computer implemented advertising or product recommendation systems), and forming groups or clusters of individuals based on trainable similarity metrics between pairs of individuals.

8 Implementations

The approach can be implemented in the form of a computer program (e.g., software instructions stored on a computer readable medium for controlling a data processing system) which would be tailored to accept three-dimensional data, for example, from current available cross-sectional imaging datasets that are output by imaging units. In some implementations, the approach is incorporated into a system that acquires a three-dimensional image of a patient and provides a representation of the image to an operator of the system, typically a clinician. In some implementations, the approach is hosted separately from the system that acquires the image, for example in a separate image processing module or server that provides image analysis services. In some implementations, the approach is combined with a system that performs volume segmentation, which may combined with or separate from the image acquisition and/or image display systems.

It is to be understood that the foregoing description is intended to illustrate and not to limit the scope of the invention, which is defined by the scope of the appended claims. Other embodiments are within the scope of the following claims.

What is claimed is:

1. A system for analysis of images comprising:
a computer-implemented segmentation apparatus configured to accept image data including pixels representing an image of one or more objects and apply a segmentation procedure to the image data, wherein the segmentation apparatus includes an input for accepting segmentation parameters for controlling operation of the segmentation apparatus according to the segmentation procedure;
a computer-implemented parameter selection system configured to accept training image data including pixels of a plurality of training images and corresponding training segmentation data for the training images and produce the segmentation parameters, the training segmentation data for one of the training images characterizing at least one of spatial locations of a plurality of objects in the training image and connectivity through a single object of pairs of pixel locations in the training image;
wherein the parameter selection system is configured to select the segmentation parameters according to a parameter selection procedure that includes selecting the segmentation parameters according to a criterion based on at least one of (a) path connectivity between pairs of pixel locations including path connectivity between non-adjacent pixel locations and (b) a topology of the objects in the training image; and
wherein the parameter selection procedure includes a phase for updating segmentation parameters and a phase for comparing the training segmentation data with output from applying the segmentation procedure.

2. The system of claim 1, further comprising an image acquisition system configured to acquire the image from a biological sample.

3. The system of claim 1 wherein the criterion includes optimizing a cost function that depends on output from applying the segmentation procedure using the segmentation parameters.

4. The system of claim 1 wherein the segmentation procedure includes determining a connectivity between pairs of pixel locations according to the image data including pixels representing the image and the segmentation parameters, and forming segments according to the determined connectivity between pairs of pixel locations.

5. The system of claim 4 wherein the parameter selection procedure includes determining parameters associated with connectivity between pairs of pixel locations, and wherein the parameter selection procedure applies a non-uniform reliance on locations in the training images according to contribution of estimated connectivity at those locations to the estimated segmentation of the images.

6. The system of claim 5 wherein the segmentation procedure determines a weighted connectivity between pairs of adjacent pixels of the training data, and forming the segments includes applying a threshold to the weighted connectivities to form binary connectivities and identifying pixels that are connected via sequences on adjacent pixels.

7. The system of claim 6 wherein the non-uniform reliance on pixel locations comprises a non-uniform reliance on pairs of adjacent pixels.

8. The system of claim 7 wherein the parameter selection procedure includes, for each of a plurality of pixel locations in the training images, identifying a pair of adjacent pixels on a path between the pair of pixel locations, and determining the non-uniform reliance on pairs of adjacent pixels according to the identified pairs of adjacent pixels.

9. The system of claim 7 wherein the parameter selection procedure includes iterating over a plurality of pairs of pixel locations in the training images, and for each pair of pixel locations, identifying a pair of adjacent pixels on a path between the pair of pixel locations according to a contribution of estimated connectivity between the pair of adjacent pixels to an estimated segmentation of the images and updating a subset of the segmentation parameters that affect an estimated weighted connectivity between the adjacent pixels.

10. The system of claim 6 wherein the parameter selection procedure includes iterating over a plurality of pairs of pixel locations, including pairs of non-adjacent pixel locations, in the training images and for each pair of pixel locations identifying a link between two pixel locations on a path between the pair of pixel locations, the identified link representing degree of linkage between the pair of pixel locations.

11. The system of claim 10 wherein the degree of linkage comprises a maximum over paths linking the pair of pixel locations of minimal linkage between adjacent pixel locations the path.

12. The system of claim 1 wherein the segmentation procedure includes determining a labeling as background versus object at locations according to the data representing the image and the segmentation parameters, and forming segments according to the determined labelings.

13. The system of claim 12 wherein the parameter selection procedure includes selecting the parameters according to a criterion based topology of the objects in the images.

14. The system of claim 13 wherein the parameter selection procedure includes jointly determining segmentation parameters and transformations of the training segmentation data associated with warpings of the segmentation data that maintain topology of the objects in the training images.

15. The system of claim 14 wherein the parameter selection procedure comprises alternating between a phase for updating segmentation parameters and a phase for transformation of the training segmentation data.

16. The system of claim 15 wherein updating the segmentation parameters includes applying a gradient update according to a match between estimated pixel labelings and pixel labelings of the transformed segmentation data.

17. The system of claim 1 wherein the parameter selection procedure comprises alternating between a phase for updating segmentation parameters and a phase for transformation of the training segmentation data.

18. The system of claim 1 wherein the parameter selection procedure comprises jointly determining optimal segmentation parameters and transformation of the training segmentation data that maintains a set of topological properties of the training segmentations.

19. The system of claim 1 wherein the parameter selection procedure includes iterating over a plurality of pairs of pixel locations, including pairs of non-adjacent pixel locations, in the training images and for each pair of pixel locations identifying a link between two pixel locations on a path between the pair of pixel locations, the identified link representing degree of linkage between the pair of pixel locations.

20. The system of claim 19 wherein the degree of linkage comprises a maximum over paths linking the pair of pixel locations of minimal linkage between adjacent pixel locations the path.

21. A system for forming segments of items represented in a data set comprising:
 a computer-implemented segmentation apparatus configured to accept the data set including data that represent a plurality of items and apply a segmentation procedure to the data set, wherein the segmentation apparatus includes an input for accepting segmentation parameters for controlling operation of the segmentation apparatus according to the segmentation procedure; and
 a computer-implemented parameter selection system configured to accept training data sets including data representing items and corresponding training segmentation data for the training data sets and produce the segmentation parameters, the training segmentation data for one of the training data sets characterizing connectivity, through a single segment, between pairs of items in the training data set;
 wherein the parameter selection system is configured to select the segmentation parameters according to a parameter selection procedure that includes selecting the segmentation parameters according to a criterion based on path connectivity through sequences of pairs of items in the training data set; and
 wherein the parameter selection procedure includes a phase for updating segmentation parameters and a phase for comparing the training segmentation data with output from applying the segmentation procedure.

22. The system of claim 21, wherein the data set representing a plurality of items comprises a multi-dimensional image.

23. The system of claim 21 wherein the parameter selection procedure includes, for each training data set, forming a data representation correspond to a spanning tree in which nodes of the tree are associated with items of the data set.

24. The system of claim 23 wherein the parameter selection procedure includes, for each of one or more pairs of items in the training data set, identifying a link on a path in the spanning tree between the pair of items, and updating parameters associated with that link according to the training segmentation data for the pair of items.

25. The system of claim 21 wherein the parameter selection procedure includes iterating over a plurality of pairs of pixel locations, including pairs of non-adjacent pixel locations, in the training data sets and for each pair of pixel locations identifying a link between two pixel locations on a path between the pair of pixel locations, the identified link representing degree of linkage between the pair of pixel locations.

26. The system of claim 25 wherein the degree of linkage comprises a maximum over paths linking the pair of pixel locations of minimal linkage between adjacent pixel locations the path.

27. Software stored on a non-transitory computer readable medium, the software comprising instructions for causing a data processing system to implement:
 a segmentation module configured to accept image data including pixels representing an image of one or more objects and apply a segmentation procedure to the image data, wherein the segmentation module includes an input for accepting segmentation parameters for controlling operation of the segmentation module according to the segmentation procedure; and
 a parameter selection module configured to accept training image data including pixels of a plurality of training images and corresponding training segmentation data for—the training images and produce the segmentation parameters, the training segmentation data for one of the training images characterizing at least one of spatial locations of a plurality of objects in the training image and—connectivity through a single object of pairs of pixel locations in the training image;
 wherein the parameter selection module is configured to select the segmentation parameters according to a parameter selection procedure that includes selecting the segmentation parameters according to a criterion based on at least one of (a) path connectivity between pairs of pixel locations including path connectivity between non-adjacent pixel locations, and (b) a topology of the objects in the training image; and
 wherein the parameter selection procedure includes a phase for updating segmentation parameters and a phase for comparing the training segmentation data with output from applying the segmentation procedure.

28. The software of claim 27 wherein the parameter selection procedure includes iterating over a plurality of pairs of pixel locations, including pairs of non-adjacent pixel locations, in the training images and for each pair of pixel locations identifying a link between two pixel locations on a path between the pair of pixel locations, the identified link representing degree of linkage between the pair of pixel locations.

29. The software of claim 28 wherein the degree of linkage comprises a maximum over paths linking the pair of pixel locations of minimal linkage between adjacent pixel locations the path.

30. A system for analysis of images comprising:
- a computer-implemented segmentation apparatus configured to accept image data including pixels representing an image of one or more objects and apply a segmentation procedure to the image data, wherein the segmentation apparatus includes an input for accepting segmentation parameters for controlling operation of the segmentation apparatus according to the segmentation procedure;
- a computer-implemented parameter selection system configured to accept training image data including pixels of a plurality of training images and corresponding training segmentation data for the training images and produce the segmentation parameters, the training segmentation data for one of the training images characterizing at least one of spatial locations of a plurality of objects in the training image and connectivity through a single object of pairs of pixel locations in the training image;
- wherein the parameter selection system is configured to select the segmentation parameters according to a parameter selection procedure that includes selecting the segmentation parameters according to a criterion based on at least one of (a) path connectivity between pairs of pixel locations including path connectivity between non-adjacent pixel locations and (b) a topology of the objects in the training image; and
- wherein the criterion includes optimizing a cost function that depends on output from applying the segmentation procedure using the segmentation parameters.

\* \* \* \* \*